United States Patent [19]

Sagey et al.

[11] Patent Number: 4,740,792

[45] Date of Patent: Apr. 26, 1988

[54] VEHICLE LOCATION SYSTEM

[75] Inventors: William E. Sagey, Orange; Harold V. Lind; Carl E. Lind, both of Santa Ana, all of Calif.

[73] Assignee: Hughes Aircraft Company, Los Angeles, Calif.

[21] Appl. No.: 901,086

[22] Filed: Aug. 27, 1986

[51] Int. Cl.$^4$ .............................................. G01S 5/14
[52] U.S. Cl. ..................................... 342/457; 342/50; 342/357
[58] Field of Search ................ 342/357, 457, 463, 36, 342/34, 44, 50, 60

[56] References Cited

U.S. PATENT DOCUMENTS

| | | | |
|---|---|---|---|
| 2,470,787 | 5/1949 | Nosker | 342/12 |
| 3,068,473 | 12/1962 | Muth | 342/463 X |
| 3,206,605 | 9/1965 | Johns | 342/357 X |
| 3,248,734 | 4/1966 | Weiss et al. | 343/112 |
| 3,384,891 | 5/1968 | Anderson | 342/357 |
| 3,419,865 | 12/1968 | Chisholm | 342/457 |
| 3,445,847 | 5/1969 | Hammack | 343/112 |
| 3,518,674 | 6/1970 | Moorhead et al. | 342/457 |
| 3,531,801 | 9/1970 | Huebscher | 343/15 |
| 3,848,254 | 11/1974 | Drebinger et al. | 342/457 |
| 3,864,681 | 2/1975 | Olive | 343/112 R |
| 3,889,264 | 6/1975 | Fletcher | 343/105 R |
| 3,918,056 | 11/1975 | Merrick | 342/46 |
| 3,922,677 | 11/1975 | Tomkewitsch et al. | 343/112 R |
| 3,980,948 | 9/1976 | Olive | 342/83 D |
| 4,161,734 | 7/1979 | Anderson | 343/112 R |
| 4,215,345 | 7/1980 | MacDoran | 343/112 R |
| 4,283,726 | 8/1981 | Spence | 343/112 |
| 4,359,733 | 11/1982 | O'Neill | 342/36 |
| 4,454,583 | 6/1984 | Schneiderhan et al. | |

OTHER PUBLICATIONS

Dixon, "Spread Spectrum Systems", Wiley and Sons, 1984, pp. 7-8.

W. R. Fried, et al., Integrated Satellite Radio Navigation Surveillance and Communication System, presented at the National Radio Navigation Symposium, Nov. 13-15 1973.

Lexis Nexis Patent Searches 1-3.

*Primary Examiner*—Theodore M. Blum
*Assistant Examiner*—Mark Hellner
*Attorney, Agent, or Firm*—Thomas A. Runk; Anthony W. Karambelas

[57] ABSTRACT

A vehicle locating system (VLS) comprises a large number, for example, several million, vehicle-mounted transmitters and several benchmark transmitters; first, second and third signal relay stations and a central processing station at which the transmitter locations are determined, the central station being connected by conventional links to subscriber stations. One hundred microsecond-long RF signals are transmitted by each transmitter in a non-synchronized, mutually random manner. Each signal comprises a 20 microsecond synchronization symbol followed by six, four bit transmitter indentification symbols, each of ten microseconds length. Following the indentification symbols are 10 microsecond message and processing symbols. The control station includes correlation means for correlating the synchronization symbols on each relayed signal against stored data to identify the beginnings of the signals. Identification symbols of each signal are then decoded by correlation means to establish transmitter identification, a combination of $16^6$ possible identifications being provided. Signals arriving in the central station are time-tagged upon arrival and the time differences of arrival (TDOA) are used to compute transmitter location. Benchmark transmitter computed locations are used to calibrate the VLS. Means may be provided on the vehicle transmitters to enable the rate of transmissions to be varied, to thereby enable encoding preselected messages relating, for example, to vehicle motion, vehicle crashes and vehicle intrusion/theft, responsive to associated sensors. Alternatively, or in addition, specific, prestored messages may be encoded into the transmitted signals manually or automatically in response to sensor input.

31 Claims, 7 Drawing Sheets

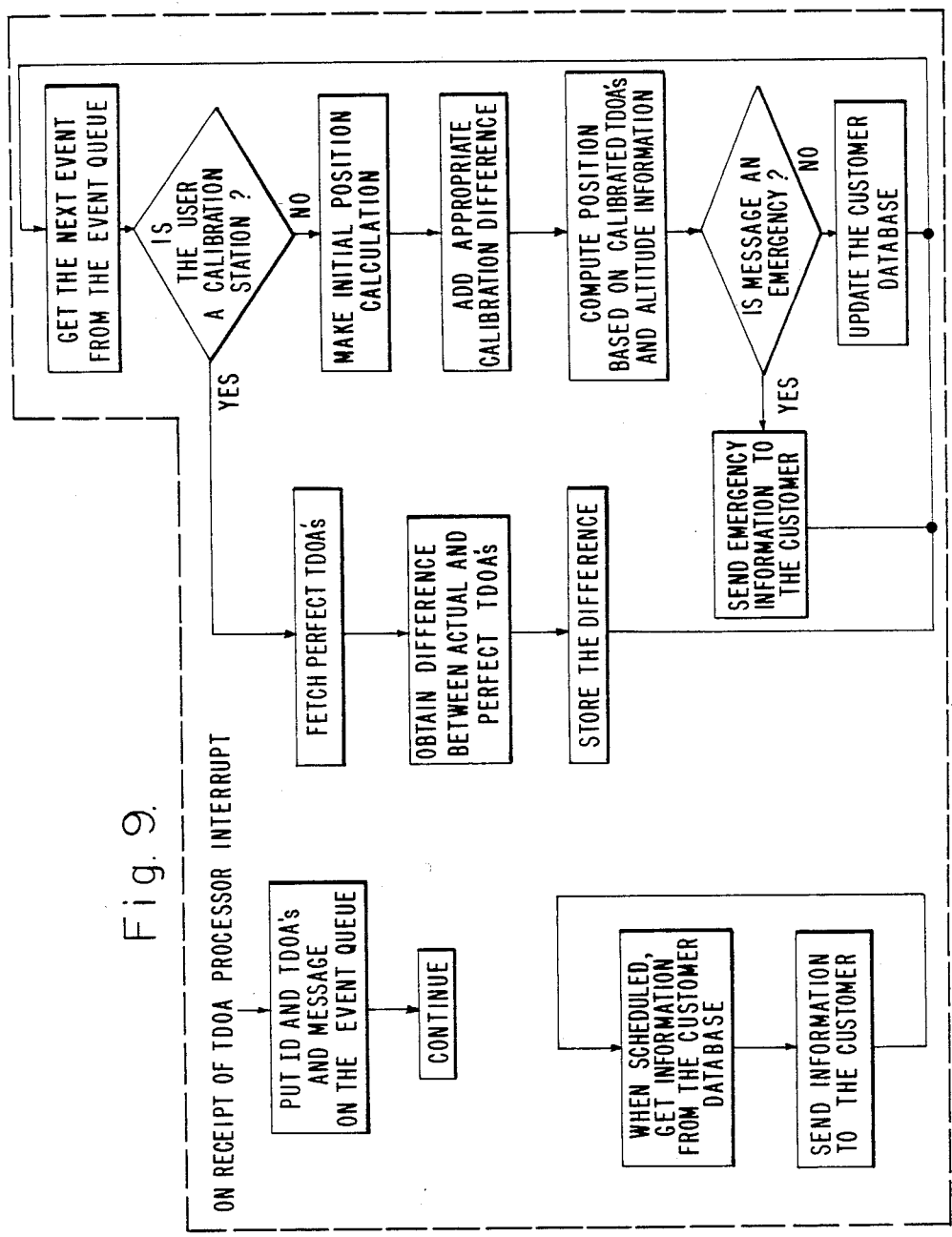

VEHICLE LOCATION SYSTEM

BACKGROUND OF THE INVENTION

1. Field of the Invention

The present invention relates generally to apparatus and methods for remotely determining the location of such movable objects as automobiles, trucks, railway cars, ships and boats, (generically referred to as vehicles), and more particularly to apparatus and methods for determining the locations of such objects at a centralized control station by the processing of radio frequency transmissions from transmitters mounted on the objects.

2. Background Discussion

Information concerning the location of surface vehicles, ships, airplanes and the like is important for many reasons, including business, safety and security reasons. As is well known, the apparatus and methods used to determine the location of such objects have varied greatly over the centuries and have been greatly improved in accuracy and sophistication during the past several decades.

Historically, for example, early ocean navigators relied upon often extensive knowledge of ocean currents, prevailing wind directions and the positions of stars in the sky to determine their locations when out of sight of familiar landmarks, and to thereby chart their paths to intended destinations. Subsequent navigators had available chronographs, compasses, astrolabes and sextants by which to determine their approximate positions. Still more recently, ocean and air navigation has benefited from various types of radio location apparatus, including LORAN and variations thereof. Modern ships and aircraft may presently rely upon radar, inertial navigation apparatus and satellite navigation systems by which positional information can usually be determined with great precision.

Land navigation has generally been easier than ocean and air navigation, at least after traveled regions of the earth were accurately mapped. Known landmarks could always be relied up in determining positional locations on land; in unmapped or unfamiliar regions, ocean navigation apparatus and methods have been used.

Presently, at least under normal circumstances, the knowledge of one's location in most habited regions of the world is relatively easy for a vehicle operator to determine from available maps or by inquiry from local inhabitants. It is, however, generally a more difficult and costly problem for control centers remote from the vehicles to determine, at all practical times, the location of a number of vehicles which may be under direct or indirect supervision by the control center. Even assuming that the vehicle operators themselves know their vehicle locations, difficulties exist in continually providing such location information to a control center which may be responsible for supervising a great many vehicles.

Telephone communication of vehicle position on a periodic basis is, of course, possible and may, for example, be used by sales personnel who may otherwise routinely telephone their headquarters to report their activities and obtain messages. In many instances, however, frequent telephone communication is impractical and may, in any event, be very costly. Verbal communication from vehicle operators to a control center, by use of on-board, short wave radio transmitters, is frequently used to provide local area positions of trucks, taxi cabs, police cars, ambulances and fire trucks to central dispatchers. However, such radio communications are usually impractical for long ranges, are relatively costly on a per-vehicle basis and require operator intervention.

Various vehicle location systems of a more sophisticated nature have been disclosed, for example, in U.S. Pat. Nos. 4,215,345 to MacDoran and 4,359,733 to O'Neill. The O'Neill patent discloses a satellite-based vehicle position determining system which utilizes coded radio signals from transponders carried aboard land vehicles and aircraft. Relay stations on artificial satellites are used to relay the radio signals from the vehicles and/or aircraft to a remote control station which uses time of signal arrival to determine vehicle or aircraft position. The radio signals from the vehicles or aircraft are, however, provided only in response to an interrogation signal sent to transponders on the vehicle and aircraft. Thus, in such systems, two-way communication with the vehicles and aircraft is required and each vehicle and aircraft thus requires both a transmitter and a receiver. When such equipment is already available for other purposes on the vehicles and aircraft, low vehicle location equipment costs may result. However, in most instances involving land vehicles, appropriate radio communication receivers and transmitters are not already provided and the cost of adding such equipment must accordingly be borne by the vehicle location system as part of the overall system cost.

The MacDoran patent discloses a vehicle locating system based upon the detection by several stations of radio signals transmitted from vehicles. Precise, time-formatted radio signal receptions from each station are retransmitted, after time-tagging, to a central station where the signals are cross correlated with all other signals to determine the time-differences-of-arrival from the vehicle for all possible station pairs. The central station processes the time differences of arrival data to locate the vehicle's position at the intersection of derived hyperboloids. As disclosed by MacDoran, noise characteristics of each transmitted pulse are utilized to determine the time differences of arrival from all pairs of receiving stations, the presence or absence of cross correlation signals being used for decoding the vehicle identity. All receiving stations must, however, be synchronized by a calibration beacon and the system is incapable of handling overlapping signals, the latter factor limiting the system, as stated in the disclosure, to no more than about 100 vehicles.

There exists, therefore, a need for a comparatively low cost vehicle locating system that has the capability for handling many thousands or millions of vehicles, as well as for a vehicle locating system that does not require special synchronization and does not require costly two-way communication apparatus.

SUMMARY OF THE INVENTION

A vehicle locating system, according to the present invention, provides for remotely determining the locations of a comparatively large number of vehicles operating within a specific geographical region. Comprising the vehicle locating system are a number of similar, automated radio frequency transmitters adapted for mounting on vehicles and first, second and third (and possibly a fourth) elevated relay stations for receiving transmitted signals from the vehicle-mounted transmitters and for relaying such signals to a central processing station at which the relayed signals are processed to obtain vehicle location information, for example, to be provided to system subscribers.

Each of the transmitters is configured for transmitting radio frequency signals that are similar for all transmitters except that each transmitter has means for encoding into its transmitted signals a unique transmitter identification code. Further, each transmitter includes means for causing its signals to be transmitted at a predetermined repetition rate. Importantly, each transmitter operates independently of all other transmitters, the transmitters thus operating in a mutually random manner.

The central processing station of the invention is configured for separately receiving the relayed signals from the first, second and third relay stations, which are spaced apart from one another at known locations relative to the geographical region covered by the vehicle locating system. Comprising the central processing station are means for separating the received, relayed signals from one another, especially when the incoming siganls are overlapping; means for encoding on the received signals the tinme of arrival at the processing station and means for determining from time differences of arrival (TDOA) of the signals the location of the associated transmitters, and thus the location of the vehicles on which the transmitters are mounted.

To enable separation of the relayed signals, each transmitter includes means for encoding a preestablished synchronization code into each transmitted signal, the synchroniazation code being the same for all transmitters. Preferably, this synchronization code is encoded into a synchronization symbol at the beginning of each signal transmitted. This synchronization symbol may, for example, be no more than about twenty microseconds long. Following the synchronization symbol are transmitter identification symbols; preferably six identification symbols are provided and preferably each such symbol has four data bits which enable sixteen different numbers per identification bit. With such a data provision, $16^6$ (16,772,216) number combinations are possible so that an equal number of transmitters can be individually identified.

Within the central processing station, the means for separating the relayed signals from one another include means for correlating the synchronization data encoded into the synchronization symbol with a corresponding stored code in a manner enabling the beginning of individual signals to be identified even in the presence of overlapping signals. Data correlation means are provided for determining from the signal identification symbols the transmitter identification, and hence the identification of the vehicle to which the identified transmitter is mounted. To decode the identification symbols, the data correlating means correlate each of the data bits with stored possible codes. Thus, for example, each information symbol which comprises four binary bits is compared, as it is received, with the sixteen possible combinations to determine which combination of bits is contained in the symbol. Preferably, each entire signal is no longer than about one hundred microseconds. Also, preferably, the transmitters format their signals in a spread spectrum format so as to enhance the ability of the central processing station to separate the signals and to decode the signals after separation.

In an embodiment of the invention, at least some of the transmitters include means for enabling the repetition rate of the signals to be varied to enable communication of messages from the transmitters to the central processing station by merely changing the signal repetition rate. In such case, motion sensing means may be associated with some of the transmitters. Responsive to the motion sensing means, the means for varying the signal repetition rate may cause the signals to be repeated at a first rate when the motion sensing means indicates that the transmitter is at rest and at a second repetition rate when the motion sensing means indicates that the transmitter is moving. The signal repetition rate associated with the transmitter being at rest may be substantially less than the repetition rate when the transmitter is moving so that signal traffic may be reduced over that which would otherwise occur if all the transmitters transmitted at the moving transmitter rate.

Vehicle anti-theft means may be included for some vehicles whose transmitters have signal repetition rate varying capability. Responsive to electric signals from the vehicle anti-theft means, the transmitter may be caused to transmit signals at a predetermined repetition rate associated with a vehicle tampering situation so that such information can be provided by the central processing station to subscribers. In addition, or alternatively, according to an embodiment of the invention, crash sensing means may be provided on vehicles equipped with variable repetition rate transmitters. Responsive to an output from the crash sensing means that indicates the probability of a vehicle crash, the signal transmission rate is shifted to a predetermined rate associated with a crash situation. Still further, some transmitters may include means for selectively encoding preestablished messagecodes into the transmitted signals for decoding at the central processing station.

It is still further preferred that the vehicle location system includes at least one benchmark transmitter mounted at a known, fixed location relative to the geographical region covered by the system. The benchmark transmitter is configured to transmit radio frequency signals similar to those transmitted by the vehicle-mounted transmitters, signals from the benchmark transmitter being processed in the same manner as those of the vehicle-mounted transmitters to determine the location of the benchmark transmitter. Differences between the actual, known location of the benchmark transmitter and the computed location thereof can be used to calibrate the system, including the locations of the relay stations.

Because a very large number of vehicles can be accommodated by the vehicle locating system of the present invention, the per-vehicle procurement and operating costs of the system can be very low and, therefore, attractive to system subscribers.

BRIEF DESCRIPTION OF THE DRAWINGS

The present invention can be better understood by a consideration of the drawings in which:

FIG. 9 is a flow diagram of the operation of the central processing station.

DESCRIPTION OF THE PREFERRED EMBODIMENT

Figure 1:
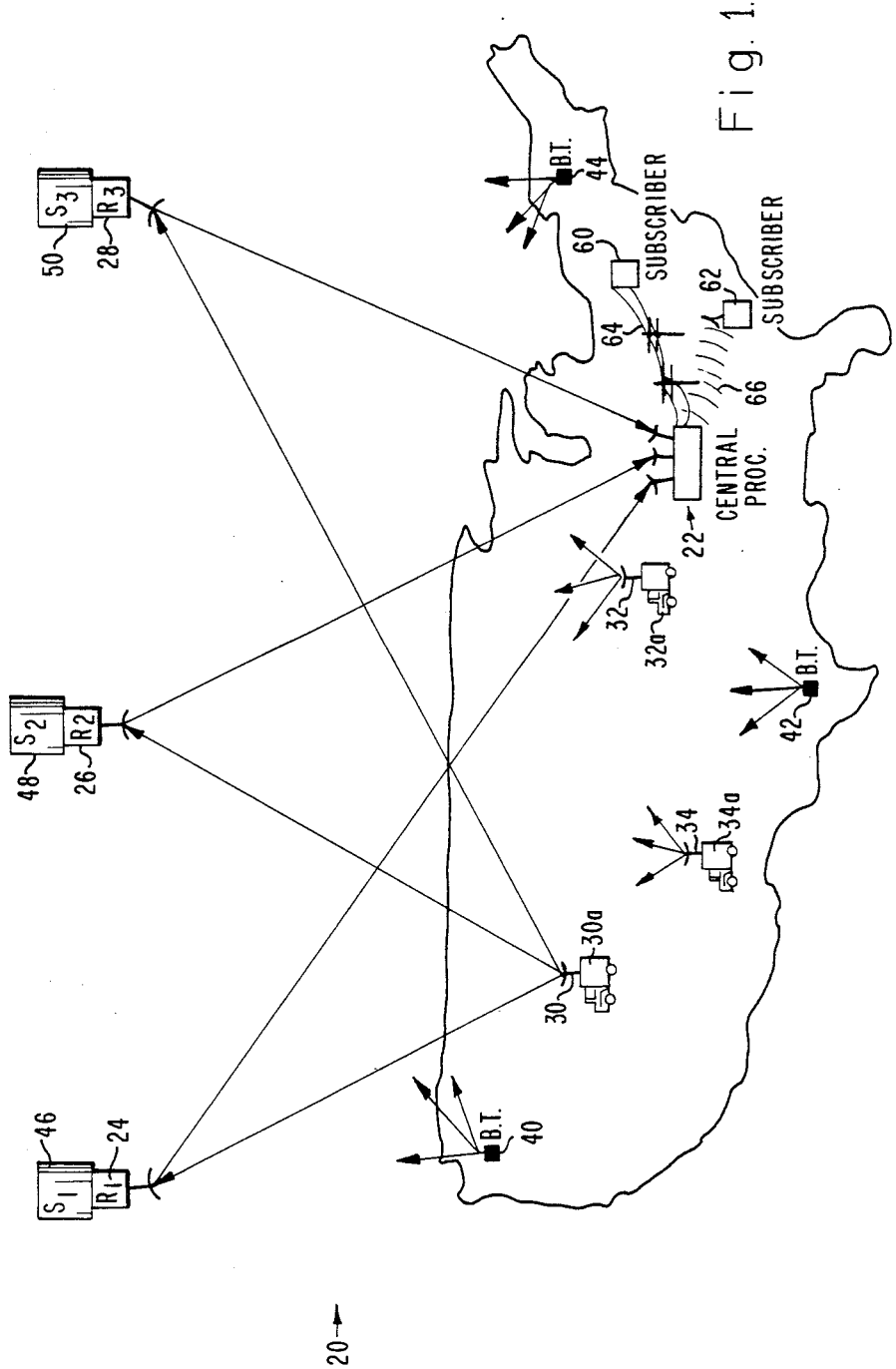
FIG. 1 is a pictorial drawing depicting a vehicle locating system (VLS) in accordance with the present invention, showing, by way of illustrative example, a nationwide VLS covering the Continental United States.

A veichle location system (VSL) 20, in accordance with the present invention, is pictorially shown in FIG. 1. As depicted, and by way of illustrative example of the invention, VLS 20 is operative over the entire Continental United States and may, therefore, be considered a nationwide vehicle locating system (NVSL). However, VLS 20 is limited neither to the Continental United States nor to any other specific region and may be used to advantage in most geographical areas of the world, subject to certain limitations that will become apparent from the following description. Neither is VLS 20 limited to large, continental areas, but may be advantageously used in such smaller areas as states, counties and cities.

As more particularly described below, VLS 20 is configured to provide vehicle location information at a remote, off-vehicle location, and does not specifically provide for vehicle location information to be made available to the vehicles associated with the VLS. Accordingly, a principal objective of the invention is to provide, at a comparatively low cost, location information regarding a large number of vehicles at a centralized control center from which the vehicle information can be communicated, by conventional, preexisting means, to such system subscribers as trucking, bus, vehicle rental and railroad companies or to other companies or individuals having an interest in being provided updated vehicle location information.

It is emphasized that the term "vehicle" as used herein should be broadly construed to include not only automobiles, trucks and buses, but also virtually any type of movable object such as boats, ships, railroad engines, rolling stock, construction equipment, portable shelters and aircraft. Moreover, the present VLS is also adaptable for use with and by individuals.

VLS 20, as described herein, importantly enables a relatively low per-vehicle implementing and operating cost by the use of small, low cost, standardized vehicle transmitters which randomly, with respect to each other (as opposed to synchronously), transmit radio frequency (RF) signals which are similar for each transmitter except for unique transmitter identification coding.

Illustrated in FIG. 1 as comprising VLS 20 is a central processing station or center 22 at which vehicle locations are computed from transmitted signal time differences of arrival (TDOA). Further comprising VLS 20 are at least first, second and third elevated radio signal relay stations 24, 26 and 28 which receive vehicle transmitter RF signals and relay or retransmit these signals to processing center 22 for processing. Also comprising VLS 20 are a large number of what may be termed "vehicle transmitters", only three of which are shown in FIG. 1, being identified by the reference numbers 30, 32 and 34. The number of vehicle transmitters used in or accommodated by any specific VLS depends upon such factors as the size of the geographical region served by the VLS, the number of subscribers to the VLS service and the purpose and scope of the VLS involved. The number of vehicle transmitters may thus vary widely between, for example, a few hundred and several million. However, VLS 20 of the present invention is especially useful for very large numbers of vehicle transmitters because of its unique data handling capability.

Further comprising VLS 20 are one or more calibration or benchmark transmitters. Three such benchmark transmitters are depicted in FIG. 1, being identified by reference numbers 40, 42 and 44. These benchmark transmitters 40, 42 and 44 are ground-mounted in widely-spaced apart, fixed locations so as to cover the region served by VLS 20. Preferably, but not necessarily, benchmark transmitters 40, 42 and 44 are constructed similarly to vehicle transmitters 30, 32 and 34 and in any event transmit similar RF signals. These benchmark RF signals are relayed along with RF signals from vehicle transmitters 30, 32, 34 (etc.) by relay stations 24, 26 and 28 to processing station 22. Because the locations of benchmark transmitters 40, 42 and 44 are precisely known, the benchmark RF signals can be used to calibrate the system and to establish the exact locations of relay stations 24, 26 and 28 to enable compensation for any movement thereof from their "fixed" locations. It will, of course, be understood that knowledge of the precise locations of relay stations 24, 26 and 28 relative to control station 22 is necessary to enable accurate determination of the locations of the vehicle transmitters 30, 32, 34 (etc.) relative to a preestablished grid system or map.

Vehicle transmitters 30, 32 and 34 are depicted, by way of example in FIG. 1, as being mounted on respective wheeled vehicles 30a, 32a and 34a. Also by way of example, relay stations 24, 26, and 28 are depicted in FIG. 1 as being mounted on respective artificial satellites 46, 48 and 50, which are in geosynchronous orbits above the region (for example, the Continental United States) served by VLS 20. The mounting of relay stations 24, 26 and 28 on geosynchronous satellites 46, 48 and 50 (assuming proper satellite selection and positioning) advantageously enables each relay station 24, 26 and 28 to be in a line-of-sight relationship with processing station 22, with benchmark transmitters 40, 42 and 44 and ordinarily with all of vehicle transmitters 30, 32, 34 (etc.), thereby assuring good reception by the relay stations of signals transmitted by the benchmark and vehicle transmitters, and also ensuring good reception of the relayed signals by processing station 22.

However, for more localized VLS's all or some of relay stations 24, 26 and 28 may be ground based, being, for example, installed in high mountain locations, atop tall buildings or on radio towers. Because relay stations 24, 26 and 28 are merely RF signal repeaters and perform no data processing, the stations are not large and, in the case of satellite mounting, do not require "dedicated" satellites, but can be carried aboard commercial satellites used principally for other purposes.

Also depicted in FIG. 1, but not comprising part of VLS 20, are two representative subscriber stations 60 and 62 which are illustrated as being respectively connected, for communication purposes, to processing station 22 by preexisting telephone lines 64 and by a microwave or radio link 66. Ordinarily, many such subscriber stations would be connected by conventional communication links to processing station 22.

Figure 2:
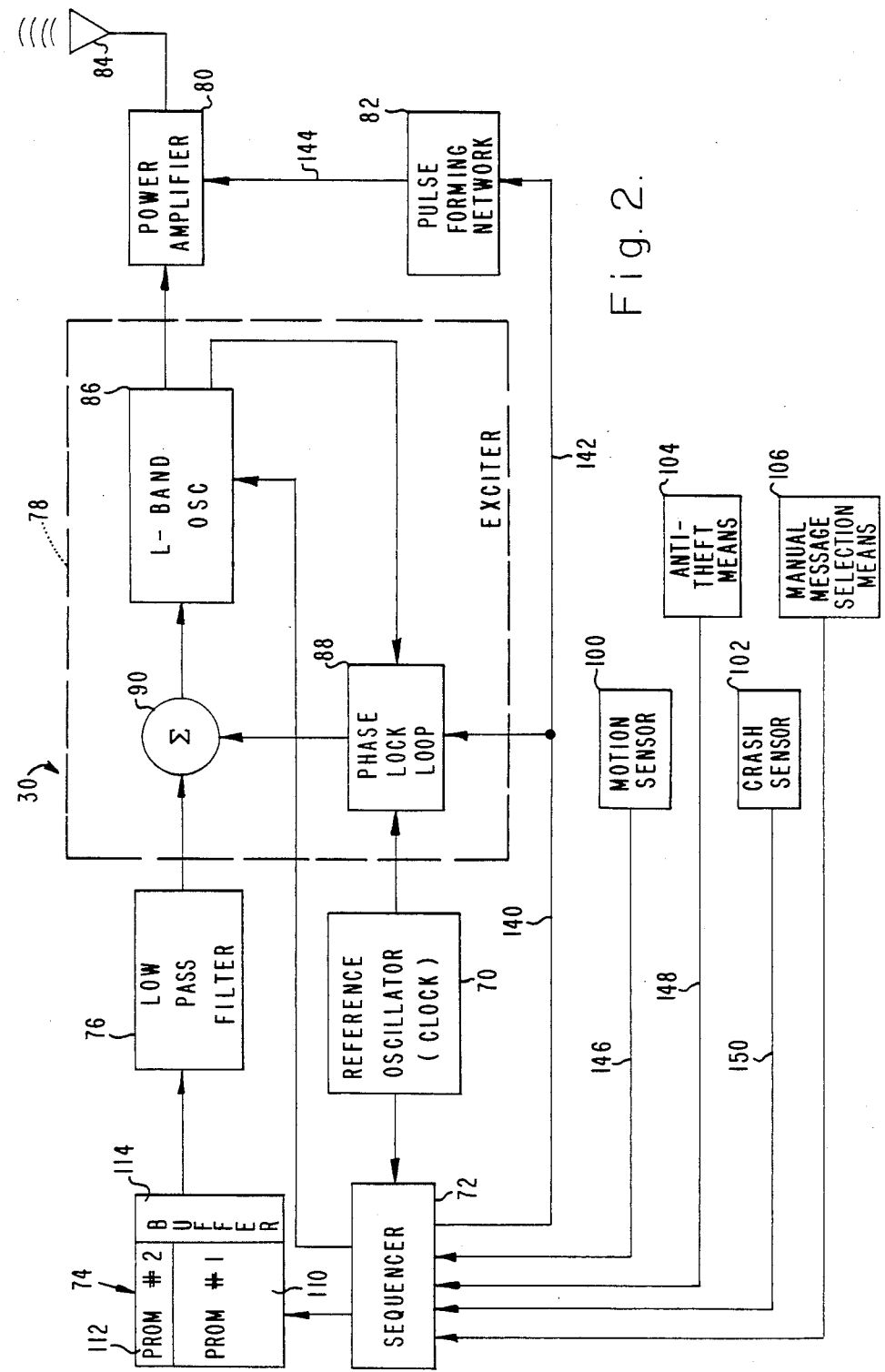
FIG. 2 is a functional block diagram of a representative radio frequency (RF) transmitter used in the VLS of FIG. 1 showing major parts of the transmitter.

Vehicle transmitters 30, 32, 34 (etc.) are constructed as shown in FIG. 2, vehicle transmitter 30 being illustrated and described as representative of all vehicle transmitters and also of benchmark transmitters 40, 42 and 44. Generally comprising transmitter 30 are a reference oscillator or "clock" 70, a sequencer or operation timer 72, memory means 74, a low pass filter 76, exciter means 78, a power amplifier 80, a pulse forming network 82 and an antenna 84. In turn, shown comprising exciter means 78 are an L-band oscillator 86, a phase lock loop 88 and a summer 90. There may be connected to sequencer 72 such auxiliary equipment as a motion sensor 100, a crash sensor 102, vehicle anti-theft means 104 and manual message selecting means 106.

Motion sensor 100 and crash sensor 102 preferably comprise conventional accelerometers which may be set or selected for different "g" levels of acceleration. Motion sensor 100 is preferably set for a much lower "g" level than crash sensor 102 so that a distinction can be made between normal "g" levels associated with vehicle movement and high "g" levels expected when a vehicle crashes. Anti-theft means 104 is any commercially available or custom vehicle anti-theft apparatus which provides an electric signal in response to vehicle intrusion, tampering or unauthorized movement. In turn, message selecting means 106 may comprise a conventional keyboard or switch (not shown) by means of which several prestored message codes may be selected for encoding in the RF transmission of associated vehicle transmitter 30, Sequencer 72 controls the RF signal repetition rate and the formatting of the RF signal. Memory means 74, which preferably comprises first and second PROMs (programmable read only memories) 110 and 112, respectively, and a data buffer 114, contains signal formatting information, including the transmitter identification code (stored in first PROM 110) and specific message codes (stored in second PROM 112). Codes for a limited number of such messages as "need assistance," "accident," and "out of service" may be stored in PROM 112 and may be automatically selected by signals from crash sensor 102, anti-theft means 104 or manually by manual message selecting means 106.

Figure 3:
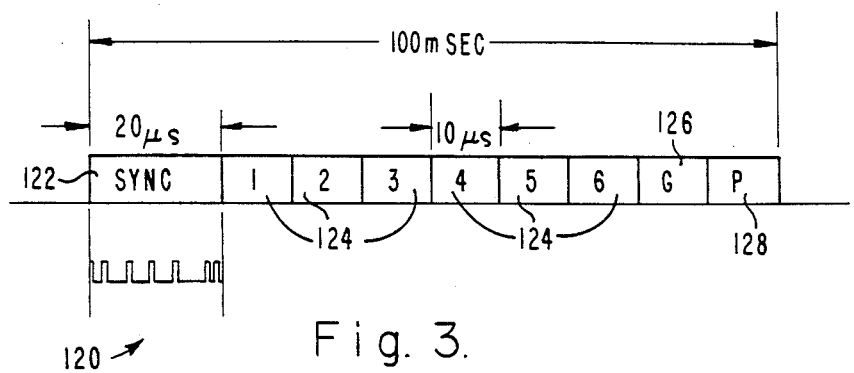
FIG. 3 is a diagram of the RF signal transmitted by the transmitter of FIG. 2 showing the signal divided into its various symbols and showing the manner in whichspread spectrum techniques are applied to represent the synchronization symbol of the signal by a large number of signal elements, called chips.

Transmitter 30 is advantageously configured to provide an RF message signal 120 of the format depicted in FIG. 3. As so depicted, signal 120 may be 100 microseconds long and may include a 20 microsecond synchronization symbol 122 followed by six (6) data symbols 124, each of which may contain four (4) data bits or information and may be 10 microseconds long. Data symbols 124 are used to format the transmitter identification code or number, there being the possibility of $16^6$ (16,777,216) possible vehicle identifications, which can be provided by data symbols 124.

A four bit field symbol 126, also 10 microseconds long, follows the data symbols 124 and 16 codes are therefore available for message encoding. Some codes in field symbol 126 may alternatively be used for signal processing instructions. Following field symbol 126 may be a 10 microsecond processing symbol used for time tagging, as described below.

To enable processing a large number of transmitter signals which may be only slightly separated in time, signals 120 are preferably formatted by known spread spectrum techniques. Such techniques, are, for example, described in "Spread Spectrum Systems" by R. C. Dixon, John Wiley and Sons, Publishers, 1976, and in the present case preferably provide a "chip" rate of about 6.4 million chips per second. Synchronization symbol 122 is thus sub-divided into 128 chips which comprise a pseudo-random pattern of binary ones and zeros. By "pseudo-random" it is meant that the pattern of ones and zeros is quasi-random but the pattern is known. Each vehicle transmitter 30, 32, 34 (etc.) and each benchmark transmitter 40, 42 and 44 is configured to provide the same synchronization pattern of chips by which the beginning of each signal can be identified. Vehicle identification symbols 124 are similarly spread spectrum formatted, each being formed of 64 chips which are arranged in a specific pseudo-random manner of binary ones and zeros. Symbols 126 and 128 are similarly formatted.

In the preferred embodiment described herein, signal 120 transmitted by vehicle transmitter 30 is repeated at specific intervals (FIG. 4); however, field symbol 126 may be differently formatted to incorporate particular message codes, if provision is made for such coding. Signals 120 may, for example, be repeated at intervals of one minute so that the transmitter (vehicle) location information provided to system subscribers is always current.

Assuming, by way of example, a nominal repetition rate of one signal 120 per minute per transmitter, it is evident that for signals having a length of 100 microseconds, 600,000 non-overlapping signals can be transmitted each minute. However, because synchronization symbol 122 is only 20 microseconds long, 3 million non-overlapping synchronization symbol portions of signals 120 can be transmitted each minute and, because of the ability to data dscriminate, it is estimated that at least about 6 million transmitters 30, 32, 34 (etc.) can be handled in a single VLS 20.

Figure 4:
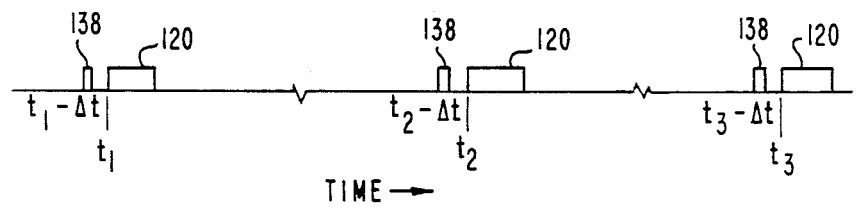
FIG. 4 is a diagram depicting the typical output of a sequencer portion of the transmitter.

For purposes of illustrating the present invention, it may be assumed that transmitters 30, 32, 34 (etc.) transmit signals 120 once every minute under normal "vehicle-in-motion" conditions, and that such signals are transmitted at times $t_1$, $t_2$, $t_3$ and so forth, as is diagrammed in FIG. 4. Sequencer 70 is, however, also configured to provide a short initiating or control signal 138 at times $t_1$-$\Delta t$, $t_2$-$\Delta t$, $t_3$-$\Delta t$, and so forth. These control signals 138 are provided, over respective lines 140 and 142 (FIG. 2), to phase lock loop 88 and to pulse forming network 82, and cause L-band oscillator 86 to attain the design frequency of operation (through operation of feed back loop 88) and cause pulse forming network 82 to be "fired" to provide (over a line 144) to power amplifier 80 a high power pulse of sufficient duration to enable outputting of signal 120. Due to this energy efficient configuration of transmitter 30, 32, 34 (etc.), a single alkaline battery of the D-cell type should operate the transmitter for about one year under normal conditions.

Sequencer 72 may also be configured, in a manner known to those skilled in the art, to cause signals 120 to be transmitted at several different, predetermined repetition rates. As an illustration, provided an electric signal is input, over a line 146, by motion sensor 100 any time in the one minute interval between routinely-timed transmissions, sequencer 72 will continue transmitting signals 20 at a normal, exemplary once per minute rate. However, in the absence of any motion sensor signals, thereby indicating that the associated vehicle is not moving, sequencer 72 may automatically select a longer time interval (such as one hour) between signal transmissions, since less frequent vehicle location updating is required when the assocated vehicle is not moving. Nevertheless, periodic updating of the vehicle location is still usually desirable to assure that the transmitter is properly functioning. This reduced transmission rate by transmitters mounted on non-moving vehicles reduces overall transmission traffic, thereby enabling a greater number of vehicles to be included in VLS 20 than might otherwise be possible. Of course, sequencer 72 could alternatively be configured to inhibit the transmission of any signal 120 when the vehicle is not in motion.

Sequencer 72 may also be configured so that responsive to electronic signals, over lines 148 and 150, from crash sensor 102 and anti-theft means 104, the time intervals between transmission of signals 120 is reduced to less than one minute. Responsive to a crash indication, signals 120 might, for example, be transmitted every five seconds. Similarly, responsive to a vehicle tampering indication, the signal transmissions might be transmitted every ten seconds. When configured in this manner to provide different, preestablished transmission periods for different conditions, information as to vehicle status is effectively "encoded" into signals 120 without actually changing the format of the signals. Such repetition rate coding is advantageous if actual encoding of messages into signals 120 is not permitted by airwave regulating authorities, such as the F.C.C, or is otherwise not considered desirable.

Figure 5:
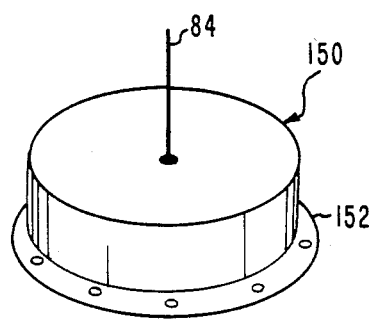
FIG. 5 is a perspective drawing of a short, cylindrical package in which the transmitter of FIG. 2 can be mounted and by means of which the transmitter can be mounted on a vehicle or other object.

Transmitters 30, 32, 34 (etc.), can, with known low-cost construction techniques be made sufficiently small to be installed in a package 150 (FIG. 5) only about five inches in diameter and only about one and one half inches thick. Antenna 84 may correspondingly comprise a short wire monopole antenna projecting from package 150. A narrow, apertured flange 152 around the base of package 150 enables convenient mounting of the package to a vehicle (or other object). Because of its small package size, transmitters 30, 32, 34 (etc.) can alternatively be mounted on (or concealed in) small objects such as shipping cartons, luggage and briefcases, and may even be carried by individuals on their person, if so desired. By the application of known microelectronic fabrication techniques, the size of package 150 may be further reduced. Moreover, it is within the scope of the present invention, for transmitters 30, 32, 34 (etc.) to be integrated into other electronic equipment, such as automobile AM/FM radios or CB radios.

Relay stations 24, 26 and 28 relay signals 120 from vehicle transmitters 30, 32, 34, (etc.) and benchmark transmitters 40, 42 and 44 to processing station 22 for processing into vehicle location information. Accordingly, relay stations 24, 26 and 28 preferably comprise signal repeates of conventional design, known in the art. When, however, relay stations 24, 26 and 28 are to be mounted onto satellites, the apparatus selected should be small and light in weight, should have low power consumption and should be especially reliable in operation. Because relay stations 24, 26 and 28 are of known, conventional configuration further description of these stations is neither considered necessary nor is provided herein.

Figure 6:
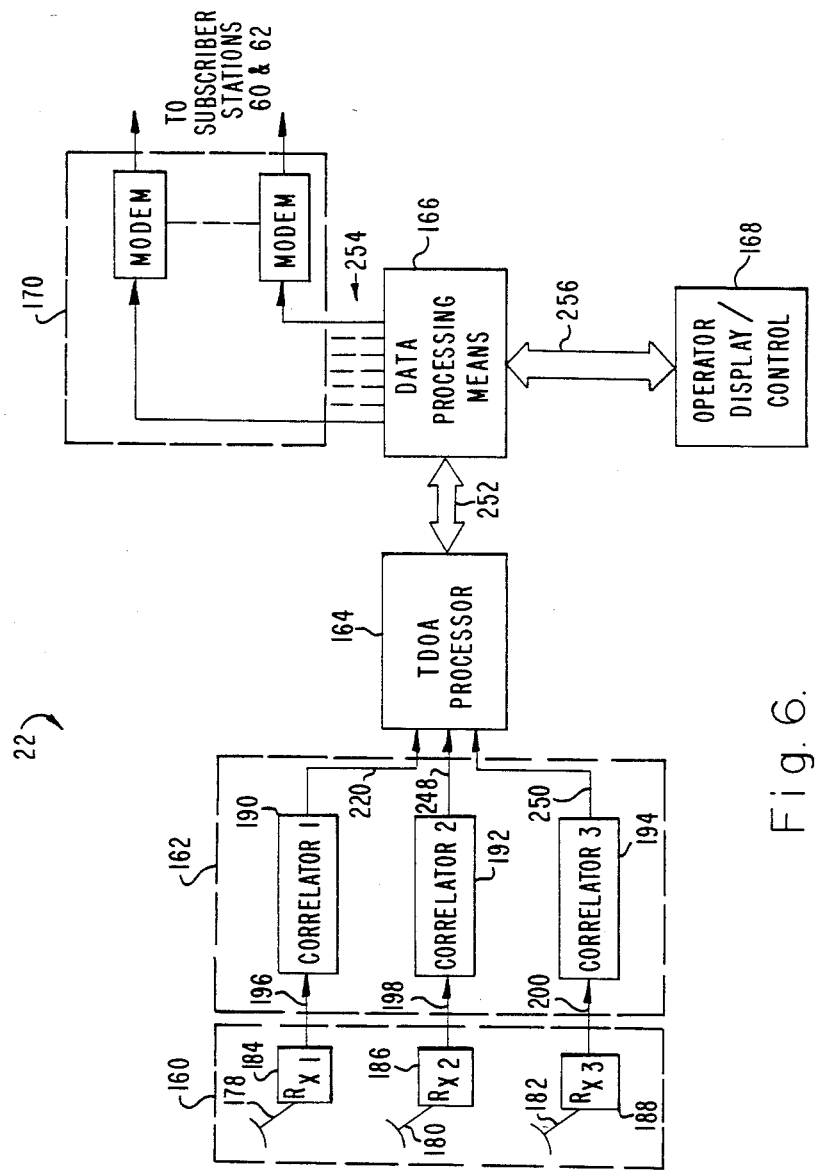
FIG. 6 is a functional block diagram of the central data processing station at which transmitter (vehicle) location determinations are made.

Central processing station 22, as shown in block diagram form in FIG. 6, comprises generally signal receiving means 160, signal correlating means 162, a time-delay-of-arrival (TDOA) processor 164, a data processor or data processing means 166, operator display and control means 168 and subscriber interfacing means 170. In turn comprising signal receiving means 160 are respective first, second and third directional antennas 178, 180 and 182, which are aimed towards corresponding relay stations 24, 26 and 28 (FIG. 1) for separately receiving relayed signals 120 therefrom. Respectively associated with antennas 178, 180 and 182 are similar first, second and third RF receivers 184, 186 and 188, each of which are of conventional design and therefore require no further description.

Similar, first, second and third signal correlators 190, 192 and 194 comprise signal correlating means 162. Spread spectrum signals 120, received by first receiver 184, via first antenna 178, are serially fed into first signal correlator 190 over a correlator input line 196. Similarly, second correlator 192 receives spread spectrum signals 120 from second receiver 186 over a signal correlator input line 198 and third signal correlator 194 receives signals 120 from third receiver 188 over line 200. Signal correlators 190, 192 and 194 are configured for sorting out signals 120 which may overlap one another due to near-simultaneous, random transmissions from different transmitters 30, 32, 34, (etc.) and 40, 42 and 44 so that corresponding time-differences-of-arrival can be determined by TDOA processor 164 and individual transmitter locations can be determined, in the manner described below.

Figure 7:
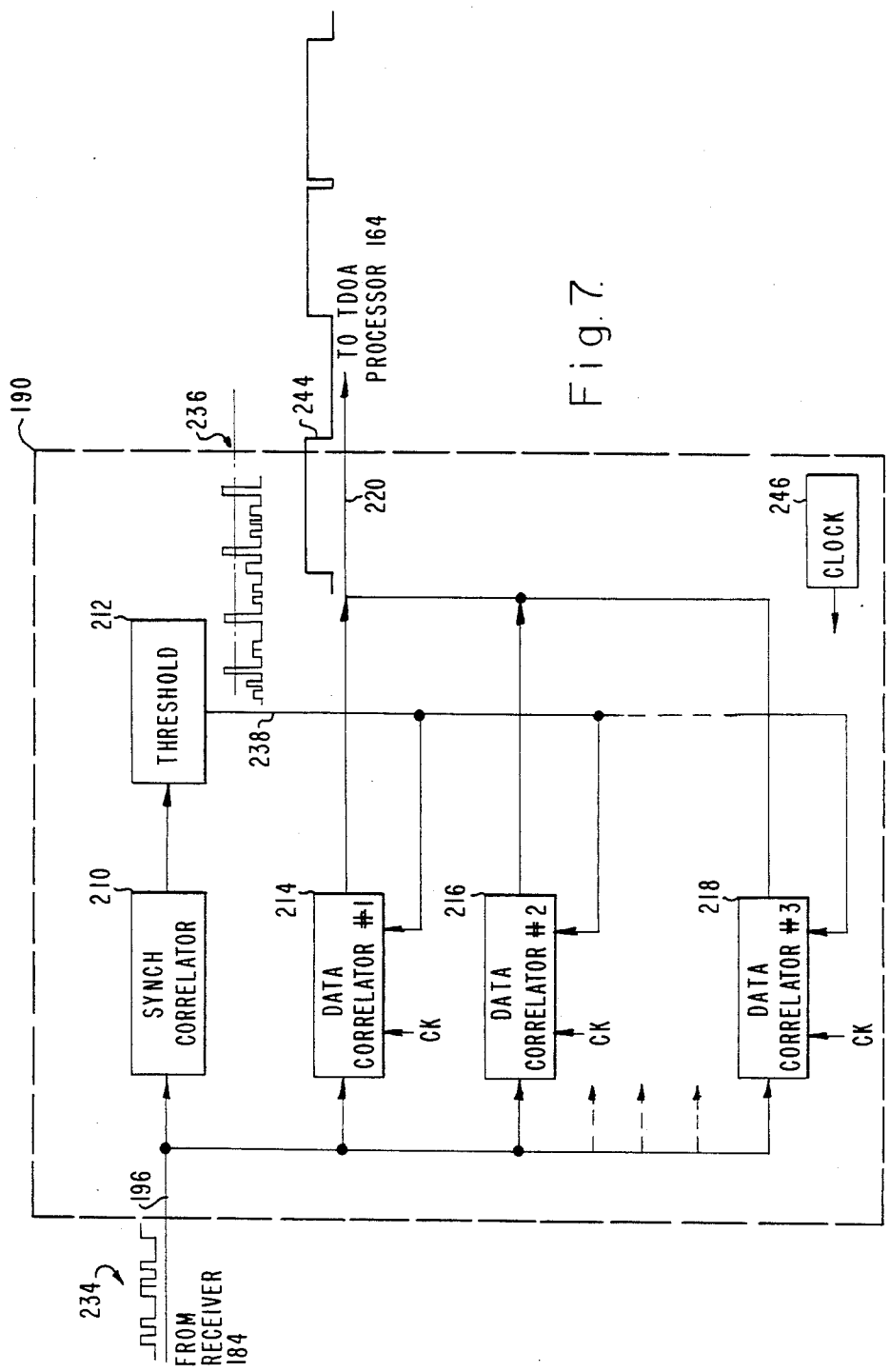
FIG. 7 is a functional block diagram of a representative signal correlator used in the central data processing station.

FIG. 7 illustrates, in functional block diagram form, one manner in which signal correlators 190, 192 and 194 may advantageously be implemented, first signal correlator 190 being shown as representative of all three signal correlators. Comprising signal correlator 190, as shown, are a synchronization correlator 210, a thresholder 212, first and second data correlators 214 and 216 and an Nth data correlator 218 (there being a total of N data correlators arranged in parallel, only the first, second and Nth data correlators being shown).

Signals, in spread spectrum format, which are received by first receiver 184 are fed, over line 196, to the inputs of synchronization correlator 210 and to first through Nth data correlators 214–218. Outputs from first through Nth data correlators 214–218 are fed, over a bus or multiple line 220, to an input of TDOA processor 164.

Figure 8:
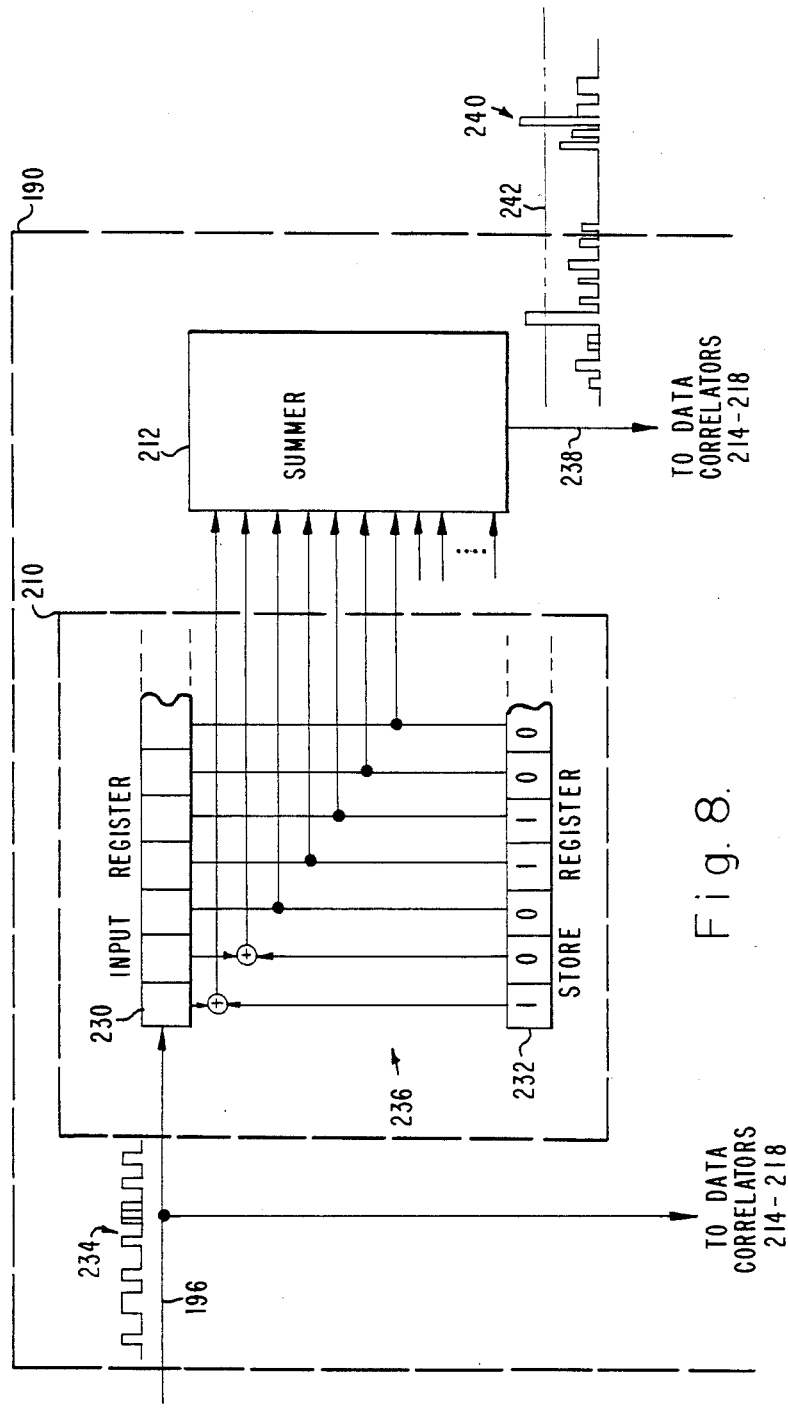
FIG. 8 is a functional block diagram of a signal synchronization correlator portion of the correlator of FIG. 7.

Synchronization correlator 210 comprises, as shown in FIG. 8, an input register 230 and a store register 232; each such register has of a number of cells equal to the number of chips in signal synchronizing symbol 122 (FIG. 3). As above-described, the number of chips in synchronizing symbol 122 may be 168. Permanently stored in store register 232 is the specific pseudo-random synchronizing symbol code used by all signals 120.

An RF signal 234 (which comprises a string of single or overlapped transmitter signals 120) received by receiver 184 from relay station 24 is provided over line 196 into input register 230. As each chip of signal 234 is fed into register 230, the content of each cell of the register is compared, in a known manner by comparing means 236, with the content of each corresponding cell in store register 232. As each set of 168 correlating inputs are received by thresholder 212, the thresholder outputs a correlation chip on a line 238 to data correlators 214–218. One such correlation chip is provided by thresholder 212 for each signal chip fed into input register 230. The string of correlation chips provided by thresholder 212 make up a thresholder output signal 240.

A maximum value correlation chip will be provided by thresholder 212 when the contents of all cells of input register 230 correlate with the contents of all cells in store register 232. This occurs only when a complete synchronization symbol 122 has been input into register 230 and thereby indicates that the beginning of a signal 120 has been received.

When VLS 20 includes a very large number of transmitters 30, 32, 34 (etc.), signal 234 provided through receiver 184 to input register 230 may frequently or occasionally comprise two or more overlapping signals 120 and may, at times, include overlapping synchronization symbols 122 from different transmitters. Typically, synchronization correlation will be poorer when overlapping synchronization symbols 122 are present than when only one such symbol is present. Synchronization symbol discrimination in the present of overlapping signals 120 is preferably provided by conventional "thresholding" techniques. A correlation threshold 242 may thus be established against which correlation chips provided by thresholder 212 are tested. Threshold 242 is established at a level such that when the level is exceeded by a correlation chip output of thresholder 212, a high probability exists that a synchronization symbol has, in fact, been input into register 230. Similarly, a high probability exists that if the correlation chips are below threshold 242 a synchronization chip has not been input into input register 230. As in the case of other thresholding situations, if threshold 242 is set too high, synchronization symbols 122 may fail to be detected and some signals 120 may be missed; on the other hand, if threshold 242 is set too low, false indications of synchronization symbols having been received into input register 230 may be provided. In either event, however, frequent transmissions of signals 120 by each transmitter 30, 32, 34 (etc) should still enable accurate transmitter (vehicle) locations determinations to be made by processing station 22.

Data correlators 214–218 are connected and configured for receiving signal 234 from receiver 184 in spread spectrum format and for outputting corresponding, non-spread spectrum signals 244 over bus 220 to TDOA processor 166 (FIG. 7). Towards this end, whenever a correlation chip provided by thresholder 212 exceeds threshold 242, the first available one of data correlators 214–218 is enabled to receive the rest of signal 120 that has just been identified by synchronzation symbol correlation in synchronization correlator 210. A sufficient number of data correlators 214–218 are provided to accommodate the maximum number of overlapping signals 120 that are expected to occur in correlator 190. If, however, no data correlator is available to accept a signal 120, the signal is automatically discarded. Again, because of the frequent repetition of signal transmissions from each transmitter 30, 32, 34 (etc.) an occasional discarding of a signal 120 is not considered to significantly affect operation of VLS 20.

The configuration and operation of data correlators 214–218 are substantially the same as described above for synchronization correlator 210. Continuing with the assumption that each identification symbol 126 of each transmitted signal 120 comprises four binary bits, sixteen possible bit patterns (0000, 0001, 0010 ... 1111) exist for each such symbol. As each chip of each identification symbol 126 is received into the available data correlator 214–218, the correlation is checked between the contents of an input register (similar to input register 130) and the contents of sixteen store registers (each similar to store register 232) in which the sixteen different binary arrangements are stored. When a correlation is found, in the manner above-described for synchronization symbol correlation, with a particular one of the store registers, the store register "number" is output over bus 220 to TDOA processor 164. For such purposes a hexadecimal system is conveniently used, the hexadecimal representations being as shown in Table 1, below. In a similar manner, data correlations 214–218 identify and decode message codes (if any) encoded into the four bits of message symbol 126, and include such message information in output signal 244 to TDOA processor 164.

TABLE 1

| Decimal | Binary | Hexadecimal |
|---------|--------|-------------|
| 0       | 0000   | 0           |
| 1       | 0001   | 1           |
| 2       | 0010   | 2           |
| 3       | 0011   | 3           |
| 4       | 0100   | 4           |
| 5       | 0101   | 5           |
| 6       | 0110   | 6           |
| 7       | 0111   | 7           |
| 8       | 1000   | 8           |
| 9       | 1001   | 9           |
| 10      | 1010   | A           |
| 11      | 1011   | B           |
| 12      | 1100   | C           |
| 13      | 1101   | D           |
| 14      | 1110   | E           |
| 15      | 1111   | F           |

Accordingly, all $16^6$ (16,777,216) possible transmitter identification numbers permitted by six symbols 124, each having four bits, can be represented by six hexadecimal "digits". As an illustrative example, the decimal number 10,705,823 can be represented hexadecimally as "A35B9F".

Data correlators 214–218 provide such processed signals, in non-spread spectrum format, over bus 242 to TDOA processor 166 (FIG. 7). In addition, data correlators 214–218 encode time of signal arrival information into signal symbol 126. To enable time tagging of the signals 120, a clock 246 provides clock signals (ck) to each of data correlators 214–218.

In the same manner, second correlator 192 operates on signals 120 received from second relay station 26 by receiver 186 and provides time-tagged, decoded signals to TDOA processor 164 over a bus 248 and third correlator 194 operates on signals 120 received from relay station 26 by receiver 188 and provides time-tagged signals to the TDOA processor over a bus 250 (FIG. 6).

TDOA processor 164 sorts the time-tagged signals from first, second and third correlators 190, 192 and 194 according to transmitter identification number and time of arrival. When a set of three time-tagged signals which represent the same signal 120 separately relayed by stations 24, 26 and 28, and thus arriving at three different times in correlators 190, 192 and 194, are found and the times of arrival are within a specific time range assuring that the signals all originated at the same time and are not from different transmissions, pairs of time differences of arrival are computed by considering different pairs of signals in each set. This time difference of arrival data is provided by TDOA processor 164 to data processor 166 over a bus 252.

From the time-difference-of-arrival data provided by TDOA processor 164, data processing means 166, which may comprise a general purpose computer, computes the location of the corresponding transmitter 30, 32, 34 (etc.) in accordance with known techniques. These known techniques compute the intersections of two hyperbolic surfaces of revolution with the transmitter location being on the line of intersection of such surfaces; in the described embodiment having three relay stations 24, 26 and 28, separate altitude information is required to establish a point on the intersection line. For surface vehicles, such altitude is assumed, for example, to be zero feet. To establish the three dimensional coordinates for non-surface vehicles (e.g. aircraft) a fourth relay station, similar to stations 24-28, may be provided. In such case, three hyperbolic surfaces of revolution are derived and a common, intersection point (x,y,z) is determined as the transmitter coordinates. Such a technique of location determination is, for example, described in the above-referenced U.S. Pat. No. 4,215,345 to MacDoran.

After the transmitter location information has been obtained in the above-described manner, the transmitter identification is cross-checked with stored transmitter-vehicle identification and vehicle location information is provided, through a bus 254 and interface means 170, to appropriate system subscriber stations 60 and 62. Alternatively, or in addition, all or some of the computed vehicle location information may be provided, over a bus 256, to operator display means 168 (FIG. 6).

Data processing means 166 further enable the counting of the repetition rate at which signals are transmitted by individual ones of transmitters 30, 32, 34 (etc.), "decoding" of signal repetition rate messages (such as "vehicle-no-in-motion," "vehicle crash" and "vehicle intrusion/theft") and providing this information to system subscribers 60 and 62. Likewise, data processing means 166 decode messages (if any) encoded into signal symbols 126 and provides such information to subscribers 60 and 62.

As mentioned above, computed location information relating to benchmark transmitters 40, 42 and 44 importantly provides calibration information for VLS 20. In this regard, the locations of benchmark transmitters 40, 42 and 44 are determined in the manner described for obtaining the locations of vehicle transmitters 30, 32, 34 (etc.). The computed benchmark locations are correlated, by data processing means 166, with benchmark transmitter surveyed location information stored in the data processing means. As long as the computed and surveyed locations of all the benchmark transmitters correlate within allowable error limits, it can reasonably be assumed that: (i) benchmark transmitters 40, 42 and 44 have not been moved, (ii) relay stations 24, 26 and 28, whose locations are used in computing transmitter locations, have not moved relative to the geographical region covered, and (iii) data processing portions of VLS 20 are properly functioning.

If, however, none of the benchmark computed and surveyed locations correlate within allowable limits of error, and if relay stations 24, 26 and 28 are satellite mounted, the possibility exists that one or more of the relay stations has moved due to satellite movement relative to central processing station 22. If it is determined that benchmark transmitters 40, 42 and 44 have, in fact, not been moved and if the computational processes of VLS 20 are determined to be properly functioning, the differences between the computed and surveyed locations of benchmark transmitters 24, 26 and 28 can then be used for recalibrating the locations of relay stations 24, 26 and 28. These recalibrated positions of relay stations 24, 26 and 28 can subsequently be used in future computations of vehicle transmitter locations.

The use of three relay stations 24, 26 and 28 has hereinabove been described, three such relay stations being sufficient to provide two dimensional, ground-level location information, as is usually satisfactory for ground vehicles. However, for vehicles in mountainous regions and for aircraft, three dimensional location information is, or may be, required. VLS 20 can then be expanded, and it is within the scope of the invention to so expand the VLS, to incorporate a fourth relay station similar to relay stations 24, 26 and 28 and to include corresponding receiving antenna, similar to antennas 178, 180 and 182; a corresponding receiver, similar to receivers 184, 186 and 188 and a corresponding, fourth correlator similar to correlators 190, 192 and 194 and to expand the TDOA and data processing capabilities to handle additional computations necessary for determining a third location coordinate.

It is further to be understood that for purposes of description, correlation means 162, TDOA processor 164 and data processing means 166 have been illustrated in the Figures and have been described as being separate. In practice, however, all such portions of processing station 22 may be combined and may comipsre a general purpose computer.

The present inventors have estimated that the individual cost of transmitters 30, 32, 34, (etc.) and 40, 42 and 44, in production quantities, will be less than 100 dollars, that the cost of central processing station 22 will be about three million dollars, (exclusive of property and buildings) and that the per-year cost of relay stations 24, 26 and 28 will be about sixteen million dollars. From these cost estimates, it is evident that the per-transmitter cost (that is, per-vehicle cost) is very small provided a sufficiently large number of vehicles are covered by VLS 20. It is this unique ability of the present VLS 20 to handle very large numbers of transmitters that importantly permits the system to be economically attractive to subscribers.

Although there has been described herein a vehicle locating system in accordance with the present invention for purposes of illustrating the manner in which the invention may be used to advantage, it will be appreciated that the invention is not limited thereto. Accordingly, any and all modifications or variations which may occur to those skilled in the art are to be considered to be within the scope and spirit of the invention as defined in the appended claims.

What is claimed:

1. A vehicle locating system for remotely determining the locations of a comparatively large number of vehicles operating within a specific geographical region, the vehicle locating system comprising:
   a. a number of similar, automated radio frequency transmitters adapted for mounting on vehicles, each of said transmitters being configured for transmitting radio frequency signals that are similar except that each transmitter has means for encoding onto the signal transmitted thereby a unique transmitter identification code, each of the transmitters having means for causing the transmitted signals to be repeated at predetermined intervals, each of the transmitters operating independently of one another and hence in a random manner relative to one another;

each said transmitter including means for encoding a synchronization code into each transmitted signal, the synchronization code being the same for each said transmitter;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for encoding onto the received signals the time of arrival at said processing station and means for determining from time differences of arrival (TDOA) of the signals from the relay stations a location of each transmitter that is transmitting signals;

the central processing means for separating the relayed signals from one another including means for correlating the signal synchronization code with a corresponding stored signal synchronization code in a manner enabling individual signals to be identified even in the presence of overlapping signals.

2. The vehicle locating system as claimed in claim 1 wherein the synchronization code is encoded into a synchronization symbol portion of the signal, the synchronization symbol being no more than about twenty microseconds in length.

3. The vehicle locating system as claimed in claim 2 wherein the synchronization symbol is at the beginning of each signal so as to enable identification of the beginning of each signal received by the central processing station.

4. The vehicle locating system as claimed in claim 2 wherein each of the transmitters includes means for coding the signals transmitted thereby in spread spectrum format so as to enhance the ability of the central processing station to separate the signals from one another.

5. The vehicle locating system as claimed in claim 2 wherein at least some of the transmitters include means for enabling the signal repetition rate to be varied so as to enable the communication of messages from the transmitter to the central processing station by changing the signal repetition rate.

6. The vehicle locating system as claimed in claim 5 including motion sensing means associated with said at least some of the transmitters and wherein the means for enabling the signal repetition rate to be varied causes the transmitter to transmit signals at a first repetition rate when the motion sensing means senses that the transmitter is at rest and at a second repetition rate when the motion sensing means senses that the transmitter is in motion.

7. The vehicle locating system as claimed in claim 6 wherein the first signal repetition rate is substantially less than the second signal transmission rate so that fewer signals are transmitted by those transmitters that are at rest than by those transmitters that are in motion, signal traffic begin thereby reduced over that which would otherwise occur if all transmitters transmitted signals at the second rate.

8. The vehicle locating system as claimed in claim 5 including vehicle anti-theft means adapted for installation on vehicles to which said at least some of the transmitters are mounted, said anti-theft means providing an electric signal in response to tampering of the vehicle in which the anti-theft means are installed, and wherein said means for enabling the repetition rate of the signal to be varied is responsive to the electric signal from the anti-theft means for causing the signal repetition rate to be increased from the normal transmitting rate to a preselected transmission rate associated with a vehicle tampering situation.

9. The vehicle locating system as claimed in claim 5 including vehicle crash sensing means adapted for installing on vehicles to which said at least some of the transmitters are mounted and wherein the means for enabling the signal repetition rate to be varied is responsive to the vehicle crash sensing means for causing the signal transmission rate to be increased from the normal transmitting rate to a preselected transmitting rate associated with a vehicle crash situation.

10. The vehicle locating system as claimed in claim 1 including at least one benchmark transmitter adapted for being mounted at a known, fixed location relative to said geographical region.

11. The vehicle locating system as claimed in claim 10 wherein the benchmark transmitter is configured to transmit radio frequency signals similar to those transmitted by the transmitters that are adapted for vehicle mounting.

12. The vehicle locating system as claimed in claim 10 wherein the central processing station includes means for determining the location of the relay stations from the time differences of arrival (TDOA) information relating to the signals transmitted by the benchmark transmitter, system calibration being thereby enabled.

13. The vehicle locating system as claimed in claim 2 including means associated with at least some of the transmitters for storing preselected message codes and means for enabling said message codes to be selectively encoded into signals transmitted by said at least some of the transmitters.

14. The vehicle locating system as claimed in claim 1 wherein each of the transmitted signals is formatted having a synchronization symbol at the beginning of each signal, followed by a plurality of transmitter identification symbols.

15. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar except that each transmitter has means for encoding onto the signal transmitted thereby a unique transmitter identification code, each of the transmitters having means for causing the transmitted signals to be repeated at predetermined intervals, each of the transmitters operating independently of one another and hence in a random manner relative to one another;

each of the transmitted signals being formatted having a synchronization symbol at the beginning of each signal, followed by a plurality of transmitter identification symbols;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for encoding onto the received signals the time of arrival at said processing station and means for determining from time differences of arrival (TDOA) of the signals from the relay stations a location of each transmitter that is transmitting signals;

the central processing means for separating the relayed signals from one another including synchronization correlation means for detecting the synchronization symbol at the beginning of each received signal and data correlating means for determining from the identification symbols following the synchronization symbol the transmitter identification associated with each received signal.

16. The vehicle locating system as claimed in claim 15 wherein each identification symbol comprises a plurality of data bits and wherein the means for determining the transmitter identification code correlates each of the data bits of each of the identification symbols with stored possible codes to enable each identification symbol to be decoded.

17. The vehicle locating system as claimed in claim 15 wherein each signal comprises six identification symbols, each said identification symbol comprising four bits, a total of $16^6$ different transmitter identifications being thereby enabled.

18. A vehicle locating system for remotely determining the locations of a comparatively large number of vehicles operating within a specific geographical region, the vehicle locating system comprising:

a. a number of similar, automated radio frequency transmitters adapted for mounting on vehicles, each of the transmitters including means for formatting signals to be transmitted by the transmitters, said signal formatting means formatting the signals with a synchronization symbol followed by a plurality of transmitter identification symbols, the synchronization symbol containing the same data for all the transmitters and the transmitter identification symbols containing data uniquely identifying the associated transmitter, each of the transmitters further including means for causing the signals transmitted by the transmitters to be repeated at a predetermined repetition rate, each of the transmitters operating independently of one another and hence in a mutually random manner;

b. first, second and third elevated radio signal relay stations for receiving the signals transmitted by the transmitters and for relaying said received signals, the relay stations being spaced apart from one another in known locations relative to the geographical region covered by the vehicle locating system; and c. a central processing station having means for separately receiving the relayed radio frequency signals from each of the relay stations, means for separating the relayed signals from one another, means for encoding onto the received signals the time of arrival at the processing station and means for determining from time differences of arrival of the signals at the processing station a location of each transmitter that is transmitting signals, said means for separating the relayed signals from one another including synchronization correlation means for determining from the synchronization symbol the beginning of individual ones of the relayed signals and data correlating means for determining from the identification symbols the transmitter identification code associated with each received signal.

19. The vehicle locating system as claimed in claim 18 wherein each identification symbol comprises a plurality of data bits and wherein each identification symbol comprises a plurality of data bits and wherein the data correlating means correlates each of the identification symbols with stored possible codes to enable each identification symbol to be decoded.

20. The vehicle locating system as claimed in claim 17 wherein each signal comprises six identification symbols and each identification symbol comprises four data bits enabling sixteen codes per identification symbol, a total of $16^6$ different transmitter identifications being thereby made possible.

21. The vehicle locating system as claimed in claim 18 wherein the synchronization symbol is no longer that about twenty microseconds.

22. The vehicle locating system as claimed in claim 18 wherein the length of each signal is no more than about one hundred microseconds.

23. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar for all said transmitters except that each transmitter has means for encoding onto the signal transmitted thereby a unique transmitter identification code, and each of said transmitters having means for encoding a synchronization code into each transmitted signal, the synchronization code being the same for each said transmitter, each of the transmitters further including means for causing the signals to be repeated at a predetermined repetition rate, each of the transmitters operating independently of one another and hence in a mutually random manner, at least some of the transmitters having means enabling the signal repetition rate to be varied so as to enable messages to be sent by the at least some of the transmitters by varying the signal repetition rate;

b. first, second and third elevated radio signal relay stations for receiving the radio frequency signals from said transmitters and for relaying said received signals, the relay stations being spaced apart from one another in known locations relative to said geographical region covered by the vehicle locating system; and c. a central processing station having means for separately receiving the relayed radio frequency signals from each of the relay stations, means for separating the relayed signals from one another, means for encoding into the received signals the time of arrival at said processing station, means for determining from differences in time arrival of the signals from the relay stations a location of each transmitter that is transmitting signals, and means for correlating the signal synchronization code with a corresponding stored signal synchronization code in a manner enabling individual signals to be identified even in the presence of overlapping signals.

24. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar for all said transmitters except that each transmitter has means for encoding onto the signal transmitted thereby a unique transmitter identification code, each of the transmitters further including means for causing the signals to be repeated at a predetermined repetition rate, each of the transmitters operating independently of one another and hence in a mutually random manner, at least some of the transmitters having means enabling the signal repetition rate to be varied so as to enable messages to be sent by the at least some of the transmitters by varying the signal repetition rate;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for separating the relayed signals from one another, means for encoding into the receive signals the time of arrival at said processing station and means for determining from differences in time arrival of the signals from the relay stations a location of each transmitter that is transmitting signals; and d. motion sensing means associated with said at least some of the transmitters and wherein the means for enabling the signal repetition rate to be varied causes the transmitter to transmit signals at a first repetition rate when the motion sensing means senses that the transmitter is at rest and at a second repetition rate when the motion sensing means senses that the transmitter is in motion, the first signal repetition rate being substantially less than the second signal transmission rate so that fewer signals are transmitted by those transmitters that are at rest than by those transmitters that are in motion, signal traffic being thereby reduced over that which would otherwise occur if all transmitters transmitted signals at the second rate.

25. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar for all said transmitters except that each transmitter has means for encoding onto the signal transmitted thereby a unique transmitter identification code, each of the transmitters further including means for causing the signals to be repeated at a predetermined repetition rate, each of the transmitters operating independently of one another and hence in a mutually random manner, at least some of the transmitters having means enabling the signal repetition rate to be varied so as to enable messages to be sent by the at least some of the transmitters by varying the signal repetition rate;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for separating the relayed signals from one another, means for encoding into the receive signals the time of arrival at said processing station and means for determining from differences in time arrival of the signals from the relay stations a location of each transmitter that is transmitting signals; and d. vehicle anti-theft means adapted for installation on vehicles to which said at least some of the transmitters are mounted, said anti-theft means providing an electric signal in response to tampering of the vehicle in which the anti-theft means are installed, and wherein said means for enabling the repetition rate of the signal to be varied is responsive to the electric signal from the anti-theft means indicating a vehicle tampering condition for causing the signal repetition rate to be increased from the normal transmitting rate to a preselected transmission rate associated with a vehicle tampering situation.

26. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar for all said transmitters except that each transmitter has means for encoding onto the signal transmitted thereby a unique transmitter identification code, each of the transmitters further including means for causing the signals to be repeated at a predetermined repetition rate, each of the transmitters operating independently of one another and hence in a mutually random manner, at least some of the transmitters having means enabling the signal repetition rate to be varied so as to enable messages to be sent by the at least some of the transmitters by varying the signal repetition rate;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for separating the relayed signals from one another, means for encoding into the receive signals the time of arrival at said processing station and means for determining from differences in time arrival of the signals from the relay stations a location of each transmitter that is transmitting signals; and d. vehicle crash sensing means adapted for installing on vehicles to which said at least some of the transmitters are mounted and wherein the means for enabling the signal repetition rate to be varied is responsive to the vehicle crash sensing means indicating a vehicle crash condition for causing the signal transmission rate to be increased from the normal transmitting rate to a preselected transmitting rate associated with a vehicle crash situation.

27. A vehicle locating system for remotely determining the locations of a comparatively large number of vehicles operating within a specific geographical region, the vehicle locating system comprising:

a. a number of similar, automated radio frequency transmitters adapted for mounting on vehicles, each of said transmitters being configured for transmitting radio frequency signals that are similar for all said transmitters except that each transmitter has means for encoding onto the signal transmitted thereby a unique transmitter identification code, each of the transmitters further including means for causing the signals to be repeated at a predetermined repetition rate, each of the transmitters operating independently of one another and hence in a mutually random manner, at least some of the transmitters having means enabling the signal repetition rate to be varied so as to enable messages to be sent by the at least some of the transmitters by varying the signal repetition rate;

b. first, second and third elevated radio signal relay stations for receiving the radio frequency signals from said transmitters and for relaying said received signals, the relay stations being spaced apart from one another in known locations relative to said geographical region covered by the vehicle locating system;

c. a central processing station having means for separately receiving the relayed radio frequency signals from each of the relay stations, means for separating the relayed signals from one another, means for encoding into the receive signals the time of arrival at said processing station and means for determining from differences in time arrival of the signals from the relay stations a location of each transmitter that is transmitting signals; and d. means associated with at least some of the transmitters for storing preselected message codes and means for enabling said message codes to be selectively encoded into signals transmitted by said at least some of the transmitters.

28. The vehicle locating system as claimed in claim 23 wherein each of the transmitted signals is formatted having a synchronization symbol at the beginning of each signal followed by a plurality of transmitter identification symbols, wherein the central processing station means for separating the relayed signals from one another include synchronization correlation means for determining from the synchronization symbols the beginning of each received signal and data correlating means for determining from the identification symbols the transmitter identification code associated with each received signal, wherein each identification symbol comprises a plurality of data bits and wherein the means for determining the transmitter code correlates each of the data bits of each of the identification symbols with stored possible codes to enable each identification symbol to be decoded.

29. The vehicle locating system as claimed in claim 27 wherein each signal comprises six identification symbols, each said identification symbol comprising four bits, a total of $16^6$ different transmitter identifications being thereby enabled.

30. The vehicle locating system as claimed in claim 23 including at least one benchmark transmitter adapted for being mounted at a known, fixed location relative to said geographical region, the benchmark transmitter being configured to transmit radio frequency signals similar to those transmitted by the transmitters that are adapted for vehicle mounting and wherein the central processing station includes means for determining the location of the relay stations from the time of arrival difference information relating to the signals transmitted by the benchmark transmitter, system calibration being thereby enabled.

31. The vehicle locating system as claimed in claim 23 wherein each of the transmitters includes means for coding the signals transmitted thereby in spread spectrum format so as to enhance the ability of the central processing station to separate the signals from one another.

* * * * *

UNITED STATES PATENT AND TRADEMARK OFFICE
CERTIFICATE OF CORRECTION

PATENT NO. : 4,740,792
DATED : April 26, 1988
INVENTOR(S) : W. E. Sagey, et al.

It is certified that error appears in the above-identified patent and that said Letters Patent is hereby corrected as shown below:

In claim 3, line 1, replace "claim 2" with --claim 1--.

In claim 4, line 1, replace "claim 2" with --claim 1--.

In claim 5, line 1, replace "claim 2" with --claim 1--.

In claim 13, line 1, replace "claim 2" with --claim 1--.

Signed and Sealed this

Fourth Day of July, 1989

*Attest:*

DONALD J. QUIGG

*Attesting Officer*     *Commissioner of Patents and Trademarks*